(12) United States Patent
Kang et al.

(10) Patent No.: US 11,220,018 B2
(45) Date of Patent: Jan. 11, 2022

(54) ULTRASONIC CUTTING HOLDER FOR HONEYCOMB CORE

(71) Applicant: DALIAN UNIVERSITY OF TECHNOLOGY, Liaoning (CN)

(72) Inventors: Renke Kang, Liaoning (CN); Zhigang Dong, Liaoning (CN); Yidan Wang, Liaoning (CN); Xianglong Zhu, Liaoning (CN); Shang Gao, Liaoning (CN); Yan Bao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 23 days.

(21) Appl. No.: 16/968,122

(22) PCT Filed: Feb. 2, 2019

(86) PCT No.: PCT/CN2019/074603
§ 371 (c)(1),
(2) Date: Aug. 6, 2020

(87) PCT Pub. No.: WO2019/161743
PCT Pub. Date: Aug. 29, 2019

(65) Prior Publication Data
US 2021/0268679 A1 Sep. 2, 2021

(30) Foreign Application Priority Data

Feb. 24, 2018 (CN) .......................... 201810157223.7
Feb. 24, 2018 (CN) .......................... 201810157271.6

(51) Int. Cl.
*B32B 7/00* (2019.01)
*B26D 7/08* (2006.01)
(Continued)

(52) U.S. Cl.
CPC ............ *B26D 7/086* (2013.01); *B06B 1/0662* (2013.01); *B23D 79/00* (2013.01);
(Continued)

(58) Field of Classification Search
USPC ................................................ 156/73.1, 73.3
See application file for complete search history.

(56) References Cited

U.S. PATENT DOCUMENTS 9,283,713 B2 * 3/2016 Heeg ...................... B29C 66/942
2004/0023187 A1 2/2004 Hickok

FOREIGN PATENT DOCUMENTS

CN 201648462 U 11/2010
CN 103978560 A 8/2014
(Continued)

*Primary Examiner* — James D Sells
(74) *Attorney, Agent, or Firm* — Novick, Kim & Lee, PLLC; Allen Xue

(57) ABSTRACT

The present disclosure discloses an ultrasonic cutting holder for a honeycomb core, including a holder, a swing mechanism, a transducer, a first-stage amplitude transformer, a second-stage amplitude transformer, an ultrasonic cutting tool, and an ultrasonic power transmission mechanism. The present disclosure provides an ultrasonic cutting holder for a honeycomb core with large amplitude output capacity and considering the interchangeability requirements among different vibration systems, which solves the problem of the applicability of ultrasonic cutting holder on the universal machine tool and improves the automation level of ultrasonic cutting.

9 Claims, 8 Drawing Sheets

(51) Int. Cl.
*B06B 1/06* (2006.01)
*B23D 79/00* (2006.01)
*B29C 65/08* (2006.01)
*B29C 65/74* (2006.01)

(52) U.S. Cl.
CPC ........... *B06B 2201/73* (2013.01); *B29C 65/08* (2013.01); *B29C 65/7443* (2013.01)

(56) References Cited

FOREIGN PATENT DOCUMENTS

| | | |
|---|---|---|
| CN | 205889592 U | 1/2017 |
| CN | 206966740 U | 2/2018 |
| CN | 108436184 A | 8/2018 |

* cited by examiner

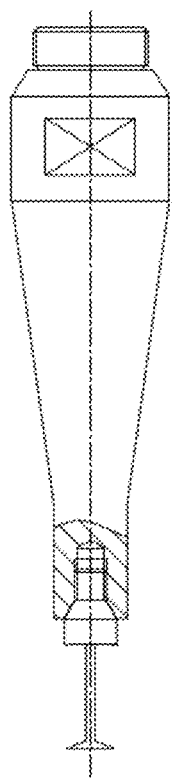
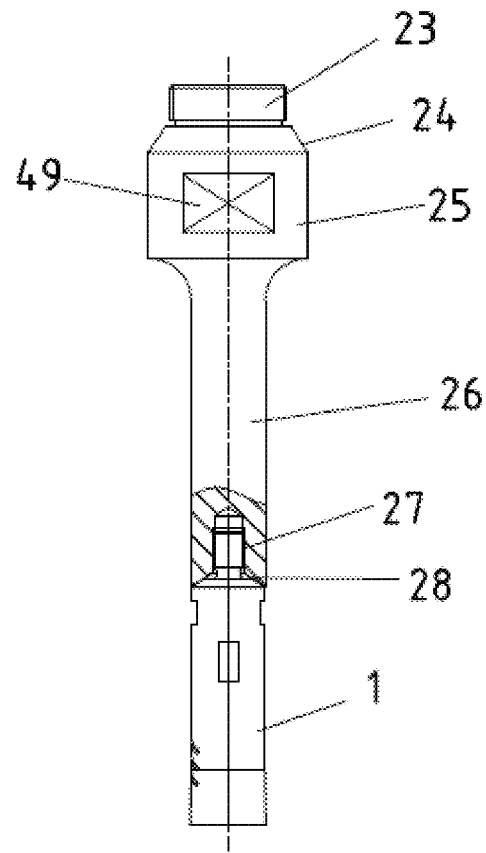
Fig. 7        Fig. 8
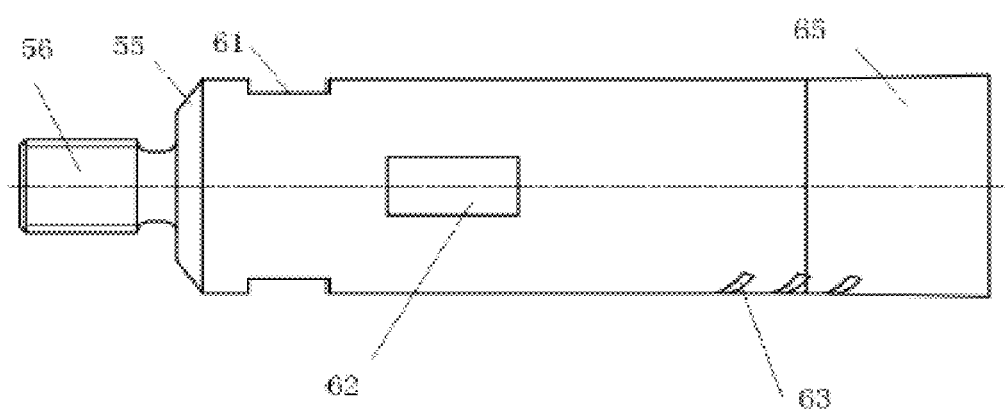
Fig. 9

ULTRASONIC CUTTING HOLDER FOR HONEYCOMB CORE

TECHNICAL FIELD

The present disclosure relates to an ultrasonic cutting holder for honeycomb core, belonging to the ultrasonic cutting field for honeycomb core material.

BACKGROUND ART

Honeycomb core material, as a kind of lightweight and high-strength fill material, is widely used in the field of aerospace. Ultrasonic cutting for honeycomb core material has advantages of high machining efficiency and good surface quality, etc., which has obvious advantages compared with the traditional method of high-speed milling.

Ultrasonic cutting for honeycomb core material requires special ultrasonic cutting equipment. In order to machine honeycomb core parts with different shapes, in addition to ultrasonic cutting machine tool for honeycomb core with multi-axis motion, an ultrasonic cutting holder with large amplitude output performance is also required. As a key point of ultrasonic cutting, the performance of ultrasonic cutting holder directly affects the machining quality of honeycomb core parts.

Traditional ultrasonic vibration assisted machining has a small ultrasonic amplitude, for example, ultrasonic vibration assisted grinding requires grinding wheel to rotate at a high speed of greater than 3000 r/min generally and the amplitude ranges from 2 to 10 microns, which is mainly assisted by ultrasonic vibration to remove materials through high-speed scratch of the grinding wheel; ultrasonic vibration assisted drilling, with the drill revolving speed of 500-3000 r/min and the ultrasonic amplitude greater than 10 microns, removes materials through high speed cutting of the cutting edge assisted by ultrasonic vibration; however, in the machining process of ultrasonic cutting for the honeycomb core, the straight-blade sharp knife does not rotate, and the revolving speed of the cutting disk is generally less than 1500 r/min, which removes the materials mainly by ultrasonic vibration of the cutter requiring the amplitude of ultrasonic vibration system greater than 30 microns; therefore, the amplification factors of an ultrasonic system is required to be 5-10 times that of traditional vibration system. As a result, the design of vibration system with large amplitude amplification factors is a difficult point in ultrasonic cutting holder.

Ultrasonic vibration assisted grinding and ultrasonic vibration drilling holders have a smaller demand for system amplitude, so a plan that a transducer directly drives a first-stage one-quarter wavelength amplitude transformer is often used, and the overall diameter and length of the vibration system are lesser. The back end of the ultrasonic cutter is connected to a machine tool by a standard taper-shank, and the front end of the ultrasonic holder is connected to an ultrasonic cutter. This kind of holder only contains a transducer in its cavity and the first-stage amplitude transformer is suspended outside the cavity, which makes this kind of ultrasonic holder small in size, easy to install and dismantle, realizing the functions of ultrasonic grinding and drilling in a form of simple holder without changing the body structure of the machine tool. Different from ultrasonic grinding and drilling holder, the ultrasonic cutting holder often needs special multi-stage vibration system to realize, and the complicated holder structure is also a difficult problem in ultrasonic cutting holder design.

Ultrasonic vibration assisted grinding and drilling machining demanding a low ultrasonic power, limited heat emitted between the transducer and its various matching surfaces, natural cooling method is often adopted, and there is no need to design a special structure between the transducer and its various matching surfaces. However, the ultrasonic cutting needing a large ultrasonic power, serious heat emitted between each matching surface, a special internal cooling structure needs to be designed to ensure the stable work of the system. The stable and reliable operation of the ultrasonic cutting holder and its internal cooling structure design are also the bottleneck restricting the application of the ultrasonic cutting.

Due to the ultrasonic cutting holder for the honeycomb core with large amplitude ultrasonic output as the goal, special design of half wavelength or whole wavelength vibration system with large length and diameter needs to be adopted; if the traditional design ideas of ultrasonic holder continues to be used, the holder cavity includes three parts of a transducer, a first-stage amplitude transformer and a second-stage amplitude transformer, which makes the overall size of the holder large and heavy. Too long holder will reduce the effective travel of the machine tool, affecting the movement of the machine tool; too heavy holder will exceed the bearing capacity of the machine tool spindle, bringing hidden trouble to the safe operation of the machine tool.

Due to various of ultrasonic cutting tools and different ultrasonic cutting tools corresponding to different ultrasonic cutting holders, it is necessary to design and manufacture a lot of matching ultrasonic cutting holders. At the same time, because the existing ultrasonic cutting holders for the honeycomb core are integrated structure, in the machining process of honeycomb core parts, the whole ultrasonic cutting holder often needs to be replaced to change a different ultrasonic cutting tool. This kind of tool change form needs to be matched with special tool holder library and tool change system to realize, and the structure of the machine tool is complex. Meanwhile, due to the long time to prepare the tool change process for grasping and storing the whole ultrasonic cutting holder and the large space to store the holders, the improvement of ultrasonic cutting automatic efficiency of honeycomb core parts is limited. And, because of different ultrasonic cutting corresponding to different set of ultrasonic cutting holders, the cost of ultrasonic cutting equipment is higher, which is not conducive to the promotion of ultrasonic cutting technology.

SUMMARY OF THE INVENTION

In order to solve the problem of availability, applicability and interchangeability of the ultrasonic cutting holder on the universal machine tool, reducing the manufacture and use cost of the ultrasonic cutting holders and improving the tool change efficiency in different ultrasonic cutting systems, the present disclosure provides an ultrasonic cutting holder for a honeycomb core which is suitable for universal machine tool and can be changed quickly.

The present disclosure provides the following technical solution:

An ultrasonic cutting holder for a honeycomb core includes a holder, a swing mechanism, a transducer, a first-stage amplitude transformer, a second-stage amplitude transformer, an ultrasonic cutting tool and an ultrasonic power transmission mechanism; wherein, the holder includes a holder standard interface at the upper end of the holder and a holder shell at the lower end of the holder, and an outer wall of the holder shell is in a shape of stepped shaft, including a small shaft segment, a middle shaft segment and a large shaft segment which are connected successively, and the small shaft segment is connected to the holder standard interface; the holder standard interface is provided with a holder center cooling hole extending to the small shaft segment;

the swing mechanism includes an upper end cover outside the small shaft segment, an lower end cover outside the large shaft segment and a fixed sleeve connected to the outer wall of the middle shaft segment by a bearing, the fixed sleeve being located between the outer edges of the upper end cover and the lower end cover; the fixed sleeve is provided with a fixed sleeve cooling hole, and the inner wall of the fixed sleeve is provided with a fixed sleeve annular bulge pressing the outer ring of the bearing on the lower end cover;

the first-stage amplitude transformer is cylindrical, and the outer wall of the lower end of the first-stage amplitude transformer is provided with a flange plate extending outward and connected to the inner wall of the large shaft segment; the upper and lower ends of the flange plate are respectively provided with an annular vibration isolation groove, the two annular vibration isolation grooves being coaxial with the first-stage amplitude transformer and being staggered with each other (that is, the radii of the two annular vibration isolation grooves are not equal, and they are arranged in a reverse direction of 180° forming a "labyrinth" vibration isolation structure to avoid the influence of ultrasonic vibration on accuracy of the machine tool spindle); the flange plate is evenly arranged a plurality of flange cooling holes; the axis location of the first-stage amplitude transformer is provided with a stepped hole passing through the first-stage amplitude transformer, the stepped hole including successively connected segments of a central cooling hole of the first-stage amplitude transformer, a taper hole of the first-stage amplitude transformer, a threaded hole connecting the first-stage and second-stage amplitude transformers and a tapered surface locating the first-stage and second-stage amplitude transformers;

the transducer includes an inner-cooling preload bolt with a hollow structure, a back shroud and an annular ceramic chip group; the inner-cooling preload bolt is threaded connected to the central cooling hole of the first-stage amplitude transformer and presses the annular ceramic chip group at the rear end of the first-stage amplitude transformer through the back shroud;

the second-stage amplitude transformer includes a connecting threaded shaft of the second-stage amplitude transformer, a matching tapered shaft of the second-stage amplitude transformer, a detachable shaft of the second-stage amplitude transformer and a connecting shaft of the ultrasonic cutting tool, which are successively connected; the connecting threaded shaft of the second-stage amplitude transformer is connected to the threaded hole connecting the first-stage and second-stage amplitude transformers; the outer wall of the matching tapered shaft of the second-stage amplitude transformer matches the tapered surface locating the first-stage and second-stage amplitude transformers; a lower end of the connecting shaft is provided with a threaded blind hole connected to the ultrasonic cutting tool; the threaded blind hole includes a thread segment of the threaded blind hole and a taper hole at the opening of the threaded blind hole; a connecting part of the ultrasonic cutting tool has a tool thread segment and a tool tapered segment matching the threaded blind hole segment and the taper hole;

the ultrasonic cutting holder for the honeycomb core is arranged according to the following displacement distribution curve: the flange plate and the tapered surface locating the first-stage and second-stage amplitude transformers are located at the node position of the displacement distribution curve; the cutting edge of the ultrasonic cutting tool is located at the maximum displacement of the displacement distribution curve. The setting of vibration node and displacement distribution curve of the ultrasonic cutting holder for the honeycomb core can effectively reduce the influence of ultrasonic vibration on the flange plate and the tapered surface locating the first-stage and second-stage amplitude transformers, and maximize the cutting effect of the ultrasonic cutting holder for the honeycomb core. The holder has a reasonable structure and compact layout.

According to the performance requirements of different ultrasonic cutting tools, the outer wall of the connecting shaft for ultrasonic cutting tools can be conical, cylindrical, conical-cylindrical compound shape, or outer contoured surface formed by functions such as exponential, step, catenary and Bezier curve. In the process of using, the switch of different ultrasonic cutting systems can be realized by changing the second-stage amplitude transformer, which reduces the cost of manufacturing and using ultrasonic cutting holders and improves the interchangeability of different ultrasonic cutting holders.

The ultrasonic power transmission mechanism includes a positive electrode insulating ring collar jointing with the small shaft segment; the upper end of the positive electrode insulating ring is located below the upper end cover, and the lower end of the positive electrode insulating ring is provided with an annular bulge on a plane, the plane being formed by inner race of the bearing and a shaft shoulder between the small shaft segment and the middle shaft segment; the annular bulge is provided with a plurality of positive electrode insulating ring cooling holes and presses the bearing cone on a shaft shoulder between the middle shaft segment and the large shaft segment; the small shaft segment is provided with a holder radial cooling hole communicated to the positive electrode insulating ring cooling holes; the positive electrode insulating ring collar joints with a positive electrode conducting ring whose lower end located on the annular bulge; the positive electrode insulating ring has a positive electrode insulating ring wiring hole, and the small shaft segment has a holder wiring hole communicated to the positive electrode insulating ring wiring hole, and the positive electrode conducting ring having a wire whose the other end is connected to the positive electrode of the transducer through the positive electrode insulating ring wiring hole and the holder wiring hole in turn; the upper end cover has an upper end cover threaded hole in which is provided with a hollow cylindrical negative electrode adapting piece; the upper end of the hollow cylindrical negative electrode adapting piece collar joints with the bottom opening of a fixed end negative electrode sleeve; the upper end of the fixed end negative electrode sleeve is provided with a fixed end electrode adjusting spring to press the fixed end negative electrode sleeve on the upper end of the hollow cylindrical negative electrode adapting piece; the inner bottom of the fixed end negative sleeve is provided with a matched fixed end insulator whose lower end is embedded with a fixed end positive electrode; the hollow cylindrical negative electrode adapting piece is internally collar joints with a hollow cylindrical electrode insulating limit member whose upper inner wall is provided with a limit annular groove, and the hollow cylindrical electrode insulating limit member is provided with a positive electrode sleeve whose outer wall has a positive electrode sleeve flange radially matching with the limit annular groove, the positive electrode sleeve sliding along the axial direction of the limit annular groove through the positive electrode sleeve flange, the positive electrode sleeve provided with a positive electrode electric brush successively extending from the lower opening of the positive electrode sleeve and the lower end of the hollow cylindrical electrode insulating limit member, the positive electrode sleeve also provided with a positive electrode electric brush adjusting spring pressing the positive electrode electric brush on the positive electrode conducting ring, and a positive electrode adjusting spring, which presses the upper end of the positive electrode sleeve on the fixed end positive electrode, is arranged between the lower end of the positive electrode sleeve and the bottom of the inner wall of the hollow cylindrical electrode insulating limit member; and there are gaps between the upper end cover and the small shaft segment, the upper end cover and the upper end of the positive electrode insulating ring, and the lower end cover and the large shaft segment.

Through the fixed end electrode adjusting spring, the positive electrode adjusting spring, the positive electrode electric brush adjusting spring, and the cooperation of the fixed end negative electrode sleeve and the hollow cylindrical negative electrode adapting piece, it realizes the reliable connection between the positive/negative electrode of ultrasonic power supply and the ultrasonic cutting holder.

The fixed sleeve and the holder shell are connected by the bearing, and the holder shell is driven by the machine tool spindle to drive the positive electrode conducting ring to rotate; the upper end cover, the fixed sleeve, the lower end cover and the ultrasonic power transmission mechanism (except the positive electrode insulating ring and the positive electrode conducting ring) do not rotate; the positive electric brush keeps contact at all times under the action of the positive electrode electric brush adjusting spring, using electric brush slip ring to ensure a reliable transmission of high-power ultrasonic power to the transducer during the rotation process on the one hand on the other hand the integration of the ultrasonic cutting holder for the honeycomb core is better, which can effectively reduce the size and quality of the ultrasonic cutting holder for the honeycomb core, provide end face space of the spindle and avoid size interference, being convenient to change the knife automatically. While transmitting power, the positive/negative electrode adapting piece also plays a role of self-adaptive contacting and transmitting torque, ensuring the ultrasonic power transmission mechanism (except the positive electrode insulating ring and the positive electrode conducting ring) without rotating. The design of the ultrasonic power transmission mechanism can quickly change the ultrasonic tool without disassembling the power transmission mechanism, which improves the automation level.

When changing the second-stage amplitude transformer, the cooling gas, entering into the holder shell through the holder center cooling hole, passing the inner-cooling preload bolt and entering into the stepped hole, cleans the threaded hole connecting the first-stage and second-stage amplitude transformers and the tapered surface locating the first-stage and second-stage amplitude transformers, which improves the matching accuracy of the tapered surface and the power transfer efficiency of the ultrasonic cutting tool; after assembling the first-stage and the second-stage amplitude transformers, the stepped hole is sealed, and the cooling gas flows out from the flange cooling holes to the joint of the connecting shaft of the ultrasonic cutting tool and the ultrasonic cutting tool, which takes away the heat of the transducer in the holder shell and meanwhile play a cooling role on the joint of the connecting shaft of the ultrasonic cutting tool and the ultrasonic cutting tool; another part of the cooling gas, passing though the holder radial cooling hole and the positive electrode insulating ring cooling holes, and flowing through a path between the fixed sleeve and the positive electrode insulating ring to the bearing and the positive electrode electric brush, takes away the heat of the transducer and the heat caused by the rotation of the bearing from the fixed sleeve cooling hole, meanwhile cleans the contact part of the positive electrode electric brush and the positive electrode insulating ring, which reduces the friction heat and improves the stability of the power transmission.

The lower end of the inner wall of the large shaft segment is provided with an annular sinking platform accommodating the flange plate, and the ultrasonic cutting holder for the honeycomb core also includes a flange end cover pressing the flange plate on the annular sinking platform by flange fastening bolts, the axis of the flange cooling hole pointing to the joint of the connecting shaft of the ultrasonic cutting tool and the ultrasonic cutting tool.

The junction surface of the ultrasonic cutting system and the holder is arranged at the flange plate; the first-stage amplitude transformer is integrally in the holder shell; the second-stage amplitude transformer is connected with the holder shell through the first-stage amplitude transformer, and the second-stage amplitude transformer is integrally outside the holder shell. This structure of holder shell only containing the first-stage amplitude transformer effectively reduces the boundary dimension and the weight of the ultrasonic cutting holder for the honeycomb core, solving the applicability of the ultrasonic cutting holder for the honeycomb core on different machine tools.

The detachable shaft of the second-stage amplitude transformer is provided with a spanner groove, and the outer wall of the connecting shaft of the ultrasonic cutting tool is conical, cylindrical, conical cylindrical compound shape, or outer contoured surface formed by functions such as exponential, step, catenary and Bezier curve.

A diameter ratio of the first-stage amplitude transformer and the second-stage amplitude transformer is greater than or equal to 2, that is, the diameter ratio of the first-stage amplitude transformer and the front end of the second-stage amplitude transformer is greater than or equal to 2.

A total length of the transducer and the first-stage amplitude transformer is an integer multiple of a quarter-wavelength, and a total length of the second-stage amplitude transformer and the ultrasonic cutting tool is an integer multiple of a quarter-wavelength plus a half-wavelength.

The connecting threaded shaft of the second-stage amplitude transformer is connected to the threaded hole connecting the first-stage and second-stage amplitude transformers through fine threads, and the tapered surface locating the first-stage and second-stage amplitude transformers is a short tapered surface with a cone angle greater than 0° and less than 90°; the threaded blind hole segment is connected to the cutting tool threaded segment through fine threads, and the tapered hole has a short tapered surface with a cone angle greater than 0° and less than 90°.

An axis of the fixed sleeve cooling hole is located above the positive electrode conducting ring, and an axis of the positive electrode insulating ring cooling hole is located below the positive electrode conducting ring.

The holder standard interface is connected to the machine tool spindle through a holder blind rivet provided with a holder blind rivet inner-cooling hole connected to the holder center cooling hole, and the holder standard interface is connected to the holder blind rivet by thread.

The outer wall of the hollow cylindrical negative electrode adapting piece is provided with a limit flange attached to the upper surface of the upper end cover;

the upper end of the hollow cylindrical negative electrode adapting piece is provided with a tapered surface, and the bottom opening of the fixed end negative electrode sleeve is provided with an opening annular groove whose bottom is matched with the upper end of the hollow cylindrical negative electrode adapting piece and inner wall is matched with the outer wall of the hollow cylindrical negative electrode adapting piece;

the hollow cylindrical electrode insulating limit member is a separated structure including a limit ring and a limit member body, the lower surface of the limit ring and the upper inner wall of the limit member body constituting the limit annular groove;

the upper end of the positive electrode sleeve is in a shape of frustum.

Negative electrode circuit loop part: the upper end of the fixed end electrode adjusting spring is fixed with the end face of the tool machine spindle (not given) and is connected with the negative electrode of ultrasonic power, and the lower end is connected with the fixed end negative electrode sleeve; the fixed end negative electrode sleeve is a hollow cylindrical conductive structure, the upper end of the fixed end negative electrode sleeve connected with the hollow cylindrical negative electrode adapting piece which is connected to the upper end cover. During use, under the spring force of the fixed end electrode adjusting spring, reliable contact is ensured between the fixed end negative electrode sleeve and the hollow cylindrical negative electrode adapting piece; the inner wall of the opening annular groove matches the outer wall of the hollow cylindrical negative electrode adapting piece, a conical contact between them realizing a automatic adjustment centering function of the electrode, and a cylinder contact between them reliably overcoming the torque generated by rotation in the use process, ensuring the safe and reliable transmission of the power; during the working process, the negative electrode of ultrasonic power flows through the fixed end electrode adjusting spring, the fixed end negative electrode sleeve, the hollow cylindrical negative electrode adapting piece, the upper end cover, the fixed sleeve, the bearing, the holder shell and the first-stage amplitude transformer, passing through the first-stage amplitude transformer to conduct with the annular ceramic chip group to form a negative electrode loop.

Positive electrode circuit loop part: the whole fixed end insulator is a cylindrical conductive structure, its outer wall being connected and matched with the inner wall of the fixed end negative electrode sleeve, its upper end being tightly connected and matched with the inner bottom of the fixed end negative electrode sleeve, the other end being a cylindrical counter bore structure where the fixed end positive electrode is embedded, and the fixed end insulator has an effect on insulating the negative electrode sleeve and the fixed end positive electrode; the upper side of the fixed end positive electrode is connected to the positive electrode of the ultrasonic power, and the lower side is connected to the positive electrode sleeve, conducting to the positive electrode of the transducer (that is, the positive electrode of the annular ceramic chip group) through the positive electrode electric brush adjusting spring, the positive electrode electric brush, the positive electrode conductive ring and the wire.

A hollow cylindrical electrode insulating limit member is arranged between the positive electrode sleeve and the hollow cylindrical negative electrode adapting piece, the lower the inner wall of the hollow cylindrical electrode insulating limit member matching with the outer wall of the positive electrode sleeve; the limit annular groove is radially matched with the positive electrode sleeve flange, the axial dimension of the limit annular groove is greater than the thickness of the positive electrode sleeve flange, which makes the positive electrode sleeve insulation and limit in its radial direction, and has a certain stretching adjustment in the axial direction.

A positive electrode adjusting spring, which presses the upper end of the positive electrode sleeve on the fixed end positive electrode, is also arranged between the lower end of the positive electrode sleeve and the inner wall of the lower end of the hollow cylindrical electrode insulating limit member.

Under the action of the elastic force of positive electrode adjusting spring, the positive electrode sleeve can move along the axial direction to ensure reliable contact with the fixed end positive electrode; during the rotating process of the ultrasonic cutting holder for the honeycomb core, the positive electrode electric brush is fixed, and the positive electrode conductive ring rotates with the ultrasonic cutting holder for the honeycomb core. Under the action of the positive electrode electric brush adjusting spring, the positive electrode electric brush and the positive electrode conductive ring are in constant contact during the rotation to realize reliable transmission of the power.

The ultrasonic cutting holder for the honeycomb core can be an independent part to realize the connection and disassembly of the whole holder and machine tool spindle.

The ultrasonic cutting tool includes a tool main body; and one end of the tool main body is provided with a tool tapered segment (to achieve the tool and the threaded blind hole segment coaxially) provided with a tool threaded segment connected to the thread segment of the threaded blind hole, and the other end of the tool body is provided with a groove including a tapered bottom, a cylindrical hole, and a frustum-shaped hole located at the opening of the groove (to reduce friction between the outer wall of the ultrasonic cutting tool and the honeycomb core material); and an arc transition is arranged between the conical bottom and the cylindrical hole (to avoid stress concentration under the action of ultrasonic), and the small end of the frustum-shaped hole is communicated with the cylindrical hole;

the frustum-shaped hole and the outer wall of the tool body constitute a flared cutting edge, the outer wall being a part located at an end of the tool body far away from the tool tapered segment and in a shape of frustum, and a small end of the outer wall is located between the two ends of the cylindrical hole;

a spanner groove is arranged at the outer wall of the tool body located between the tool tapered segment and the tapered bottom, and at least one chip outlet passing through the outer wall of the tool body is arranged at the end of the cylindrical hole close to the tapered bottom, the inner wall (close to the frustum-shaped hole) of the cylindrical hole provided with at least one chute passing though the outer wall of the tool body.

The opening diameter of the tapered bottom is less than that of the cylindrical hole.

The ultrasonic cutting tool is coaxial with the threaded blind hole after the holder thread segment and the threaded blind hole segment are fixed. The thread segment of the threaded blind hole transmits high frequency vibrations along the axial direction to the ultrasonic cutting tool.

The inner wall of the cylindrical hole is provided with a flute discharging the chips to the chip outlet, the flute being parallel to the axis of the ultrasonic cutting tool or being spiral upward from the frustum-shaped hole to the chip outlet around the axis of the ultrasonic cutting tool.

According to three different hardness of low, medium and high of the honeycomb core material in the practical application, the flute may be slotless structure, flat-groove structure and spiral structure The length between the tool tapered segment and the large end of the frustum-shaped hole is 0.25-0.5 times the wavelength of the sound wave propagation in the ultrasonic cutting tool material, which too short cannot meet the requirements of ultrasonic vibration and too long cannot ensure the axial rigidity of the ultrasonic cutting tool.

The wedge angle of the flared cutting edge is 2-10°.

The chutes incline to the tool tapered segment, and there are at least 3 chutes being parallel to each other and arranged at equal intervals along the axis of ultrasonic cutting tool, and the interval between the chutes is less than the wavelength of sound wave propagation in the ultrasonic cutting tool material; the chutes can transfer the longitudinal vibration transmitted from the threaded blind hole segment into a superposition form of torsional vibration and longitudinal vibration to the flared cutting edge, which facilitates to remove the materials during cutting.

2 or more chip outlets are evenly distributed around the ultrasonic cutting tool, the chip outlet being a rectangular outlet with the long side paralleling to the axis of ultrasonic cutting tool, or an elliptic outlet inclined to the axis of the ultrasonic cutting tool, or other shape that facilitate chip discharge.

The spanner groove is rectangular and its plane is parallel to the axis of the ultrasonic cutting tool.

The ultrasonic cutting tool is made of high-speed steel or cemented carbide or hard alloy, which can transfer high frequency axial vibration.

Compared with the prior art, the present disclosure provides an ultrasonic cutting for a honeycomb core with large amplitude output and meeting the interchangeability requirements between different vibration systems, which solves the problem of the applicability of ultrasonic cutting holder on the universal machine tool and improves the automation level of ultrasonic cutting;

the introduction of ultrasonic vibration reduces the cutting force of honeycomb core cutting, which effectively inhibits the crush deformation damage of honeycomb core cell and ensures the machining quality and precision;

ultrasonic vibration can effectively reduce ultrasonic cutting tool wear, which reduces the machining cost;

ultrasonic vibration has good friction reduction effect, which can ensure the chips automatically sliding out of the ultrasonic cutting tool in the process of tool lifting after machining without stacking in the groove and stopping to clean the cutting, so as to ensure the continuity of machining and greatly improve machining efficiency; at the same time, the honeycomb core chips that have not been discharged in time in the groove can also be discharged by flutes and chip outlet during processing, further solving the problem of honeycomb core cutting chip discharge.

Based on the above effects, the present disclosure can be widely popularized in ultrasonic cutting for honeycomb core material.

BRIEF DESCRIPTION OF THE DRAWINGS

In order to illustrate more clearly the technical solutions in the embodiments of the present disclosure or in the prior art, a brief introduction was given hereinafter to the accompany drawings that may be used in the description of the embodiments or the prior art. Obviously, the drawings described below are some embodiments of the present disclosure, and other drawings can be obtained according to these drawings without paying any creative labor for an ordinary person skilled in the art.

FIG. 7 is a sectional view of a second-stage amplitude transformer equipped with a small circular slicer knife in embodiment 1 of the present disclosure.

FIG. 8 is a sectional view of a second-stage amplitude transformer equipped with an ultrasonic cutting tool in embodiment 2 of the present disclosure.

FIG. 9 is a structure diagram of the ultrasonic cutting tool in embodiment 2 of the present disclosure.

DETAILED DESCRIPTION OF THE PREFERRED EMBODIMENTS

Figure 1:
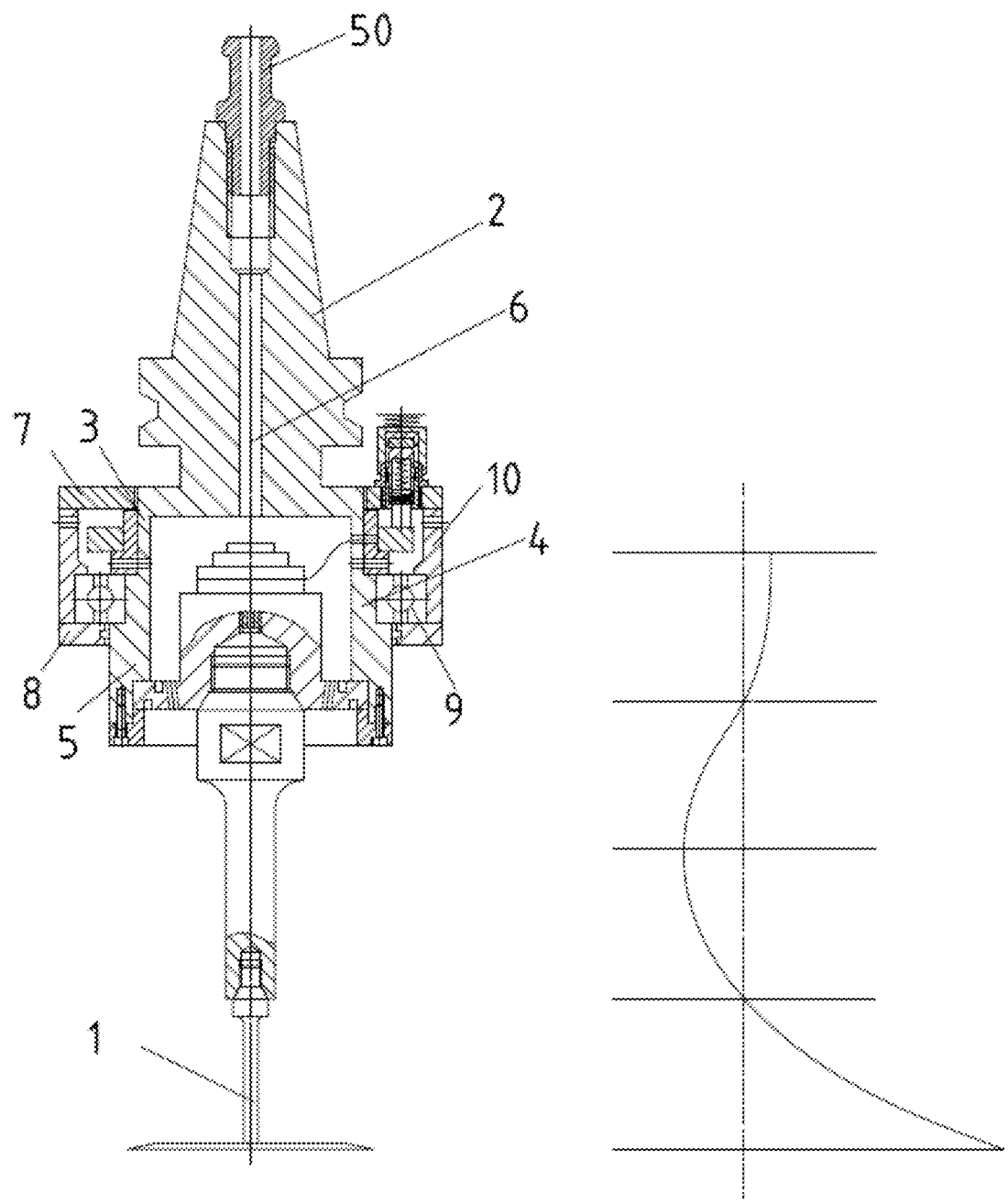
FIG. 1 is a sectional view of an ultrasonic cutting holder for a honeycomb core in embodiment 1 of the present disclosure and the schematic diagram of the corresponding displacement distribution curve.
Figure 2:
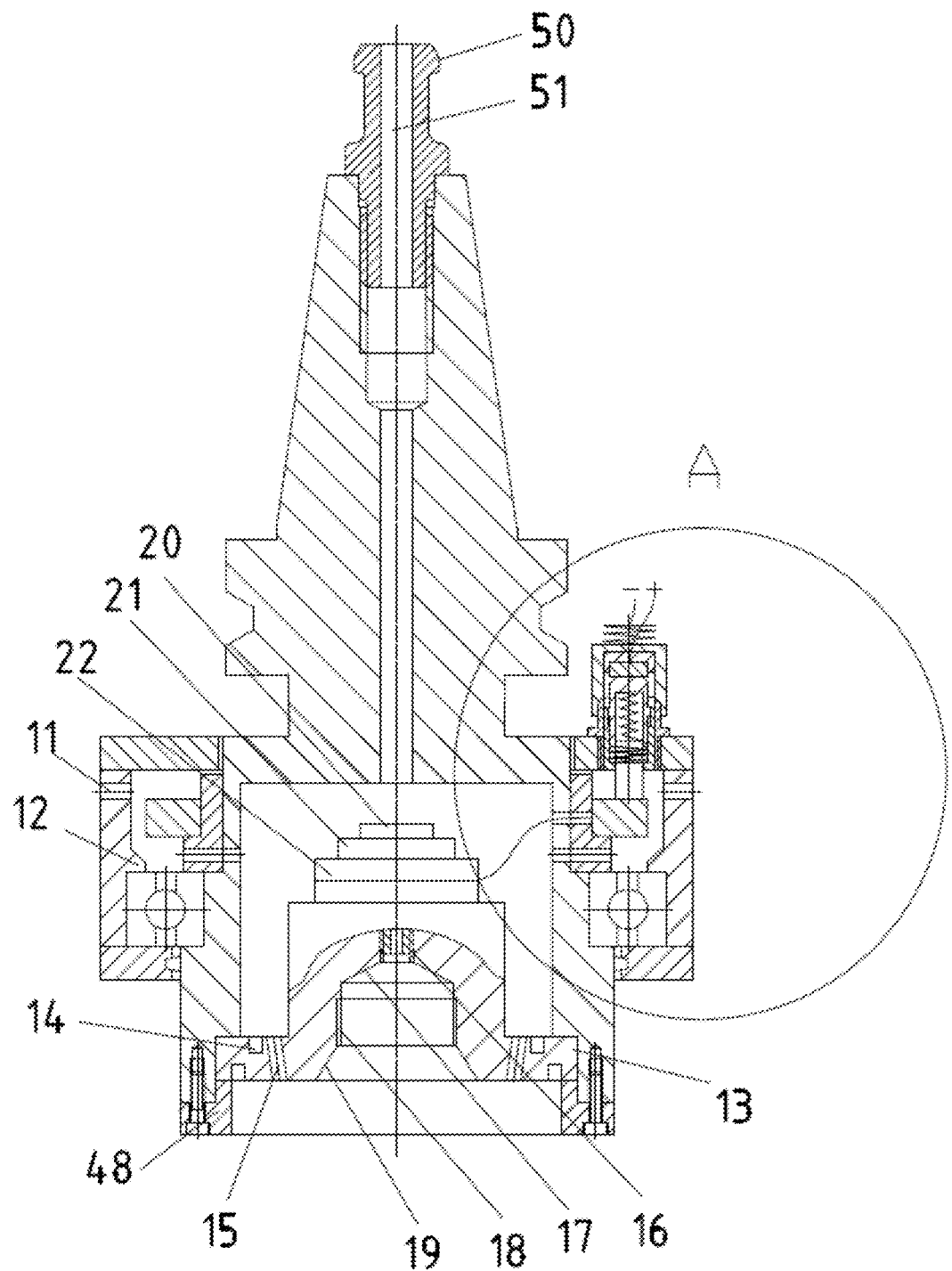
FIG. 2 is a sectional view of the ultrasonic cutting holder for the honeycomb core (except the second-stage amplitude transformer and ultrasonic cutting tool) in embodiment 1 of the present disclosure.
Figure 3:
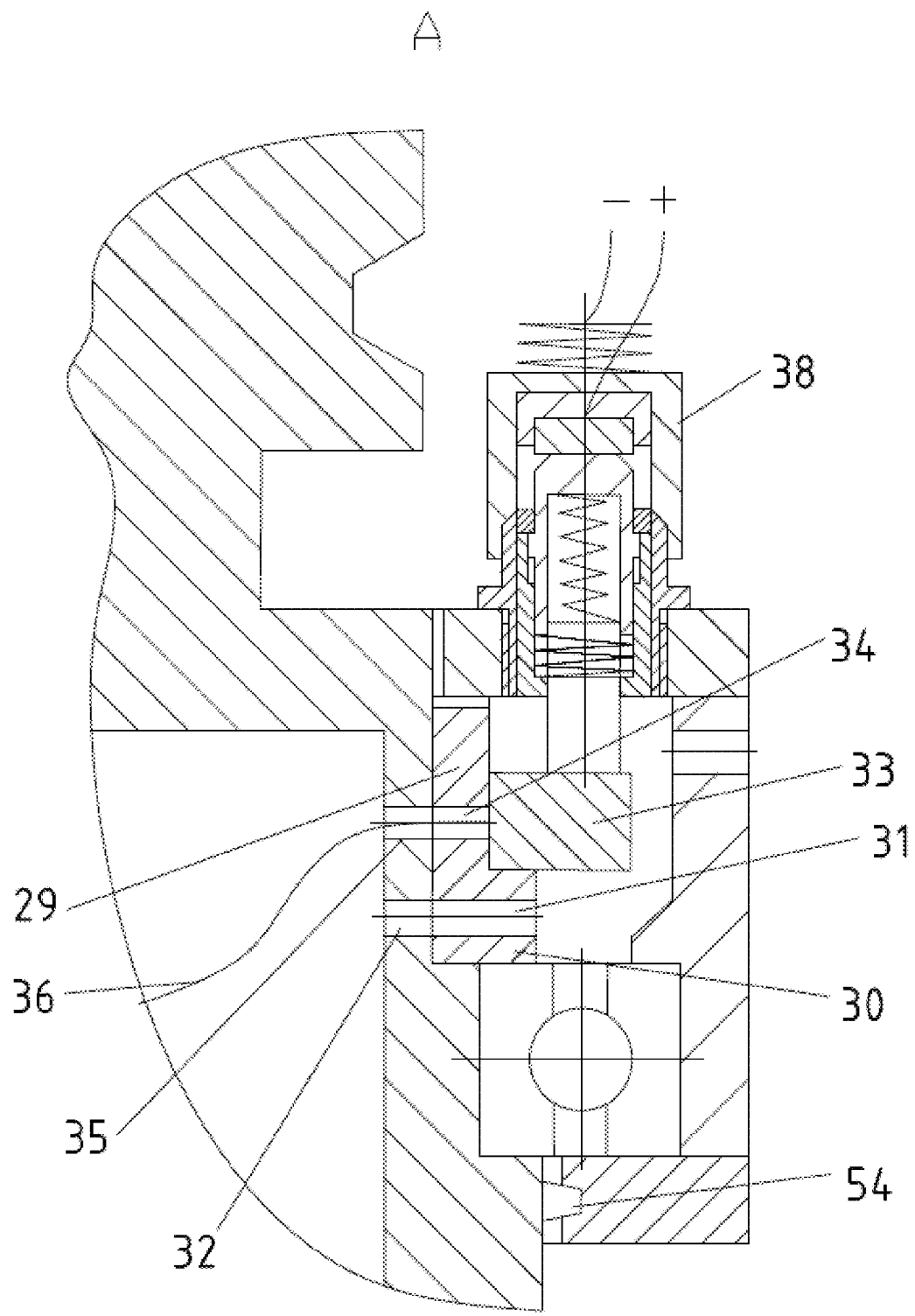
FIG. 3 is a partial enlargement view of part A in FIG. 2.
Figure 4:
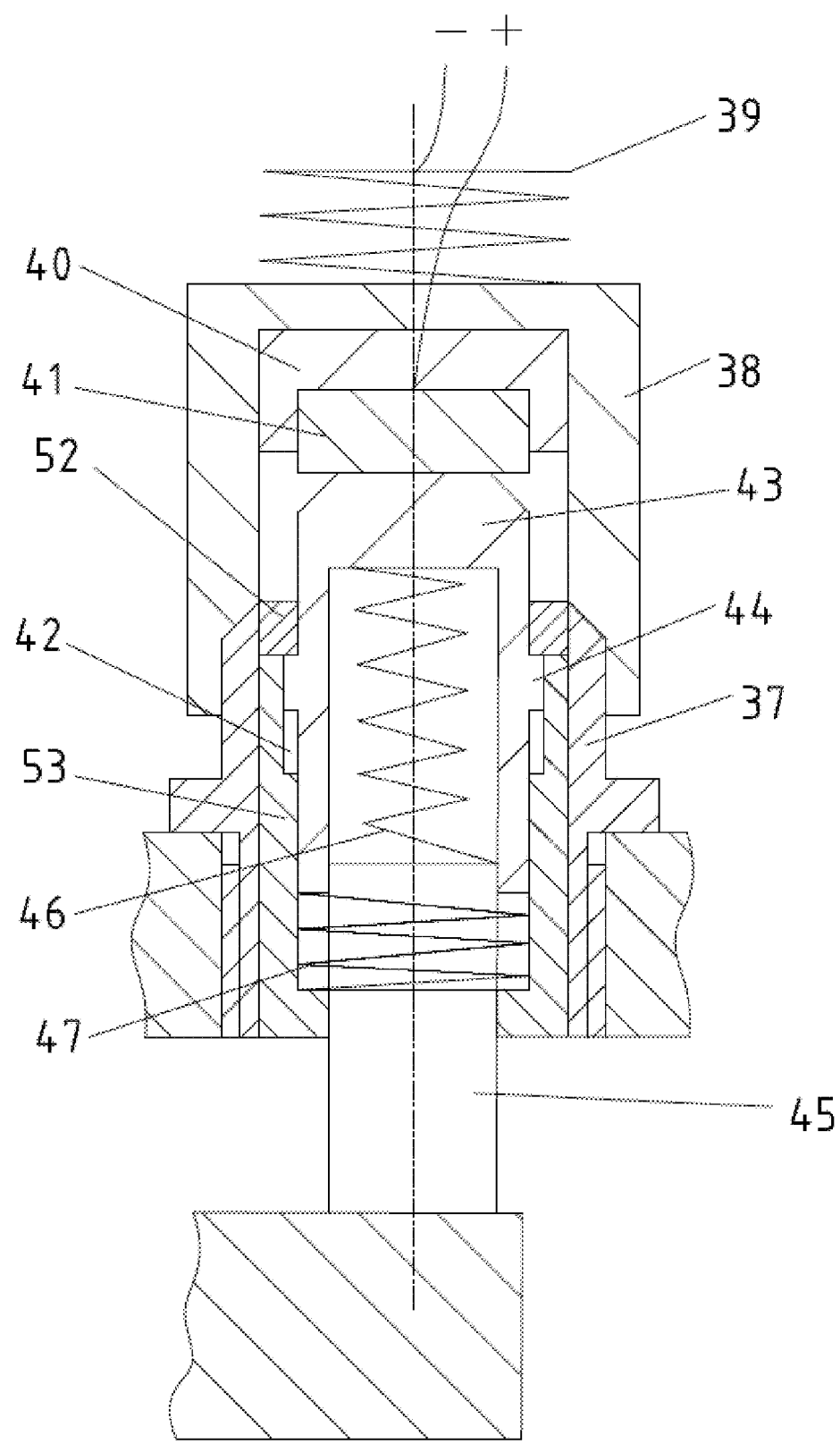
FIG. 4 is a sectional view of an ultrasonic power transmission mechanism in embodiment 1 of the present disclosure.

In order to make the purpose, technical solutions and effects of the embodiments of the present disclosure clearer, a clear and complete description of the technical solutions in the embodiments of the present disclosure will be given herein after in combination with the accompany drawings in the embodiment of the present disclosure. Obviously, the embodiments described are part of the present disclosure, not all of them. Based on the embodiments in the present disclosure, all other embodiments obtained by ordinary person skilled in the art without paying any creative labor belong to the protection scope of the present disclosure.

Embodiment 1

As shown in FIGS. 1 to 7, an ultrasonic cutting holder for honeycomb core includes a holder, a swing mechanism, a transducer, a first-stage amplitude transformer, a second-stage amplitude transformer, an ultrasonic cutting tool 1 and an ultrasonic power transmission mechanism;

the holder includes a holder standard interface 2 at the upper end of the holder and a holder shell at the lower end of the holder; the outer wall of the holder shell is in a shape of stepped shaft, successively including a small shaft segment 3, a middle shaft segment 4 and a large shaft segment 5; the small shaft segment 3 is connected to the holder standard interface 2; the holder standard interface 2 is provided with a holder center cooling hole 6 extending to the small shaft segment 3;

the swing mechanism includes an upper end cover 7 outside the small shaft segment 3, a lower end cover 8 outside the large shaft segment 5 and a fixed sleeve 10 (located between outer edges of the upper end cover 7 and the lower end cover 8) connected to the outer wall of the middle shaft segment 4 by the bearing 9; the fixed sleeve 10 is provided with a fixed sleeve cooling hole 11, and the inner wall of the fixed sleeve 10 is provided with a fixed sleeve annular bulge 12 pressing the outer ring of the bearing on the lower end cover 8;

the first-stage amplitude transformer is cylindrical; and the outer wall of the lower end of the first-stage amplitude transformer is provided with a flange plate 13 extending outward and connected to the inner wall of the large shaft segment 5; the upper and lower ends of the flange plate 13 are respectively provided with an annular vibration isolation groove 14, two annular vibration isolation groove 14 being coaxial with the first-stage amplitude transformer and being staggered with each other, and the flange plate 13 is evenly distributed a plurality of flange cooling holes 15; the axis location of the first-stage amplitude transformer is provided with stepped holes running through the first-stage amplitude transformer, the stepped holes including successively connected segments of a central cooling hole 16 of the first-stage amplitude transformer, a taper hole 17 of the first-stage amplitude transformer, a threaded hole 18 connecting the first-stage and second-stage amplitude transformers and a tapered surface 19 locating the first-stage and second-stage amplitude transformers;

the transducer includes an inner-cooling preload bolt 20 with a hollow structure, a back shroud 21 and an annular ceramic chip group 22; the inner-cooling preload bolt 20 is threaded connected to the central cooling hole 16 of the first-stage amplitude transformer, and presses the annular ceramic chip group 22 at the rear end of the first-stage amplitude transformer through the back shroud 21;

the second-stage amplitude transformer includes a connecting threaded shaft 23 of the second-stage amplitude transformer, a matching tapered shaft 24 of the second-amplitude transformer, a detachable shaft 25 of the second-amplitude transformer and a connecting shaft 26 of the ultrasonic cutting tool, which are successively connected; the connecting threaded shaft 23 of the second-stage amplitude transformer is connected to the threaded hole 18 connecting the first-stage and second-stage amplitude transformers; the outer wall of the matching tapered shaft 24 of the second-stage amplitude transformer matches the tapered surface 19 locating the first-stage and second-stage amplitude transformers the lower end of the connecting shaft 26 has a threaded blind hole connected to the ultrasonic cutting tool 1; the threaded blind hole includes a threaded segment 27 of the threaded blind hole and a taper hole 28 at the opening of the threaded blind hole; the connecting part of the ultrasonic cutting tool 1 has a tool threaded segment and a tool tapered segment respectively matching the threaded blind hole segment 27 and the taper hole 28;

the ultrasonic power transmission mechanism includes a positive electrode insulating ring 29 collar jointing with the small shaft segment 3; the upper end of the positive electrode insulating ring 29 is located below the upper end cover 7; the lower end of the positive electrode insulating ring 29 is provided with an annular bulge 30 on a plane, the plane being formed by the inner race of the bearing 9 and a shaft shoulder between the small shaft segment 3 and the middle shaft segment 4; the annular bulge 30 presses the inner race of the bearing 9 on the shaft shoulder between the middle shaft segment 3 and the large shaft segment 4, and the annular bulge 30 is provided with a plurality of positive electrode insulating ring cooling holes 31; the small shaft segment 3 is provided with a holder radial cooling hole 32 communicated to the positive electrode insulating ring cooling holes; the positive electrode insulating ring 29 collar joints with a positive electrode conducting ring 33 whose lower end is located on the annular bulge 30; the positive electrode insulating ring 29 is provided with a positive electrode insulating ring wiring hole 34, and the small shaft segment 3 is provided with a holder wiring hole 35 communicated to the positive electrode insulating ring wiring hole 34; the positive electrode conducting ring 33 is provided with a wire 36 whose the other end is connected to the positive electrode of the transducer through the positive electrode insulating ring wiring hole 34 and the holder wiring hole 35 in turn; the upper end cover 7 has an upper end cover threaded hole in which is provided with a hollow cylindrical negative electrode adapting piece 37; the upper end of the hollow cylindrical negative electrode adapting piece 37 collar joints with the bottom opening of a fixed end negative electrode sleeve 38; the upper end of the fixed end negative electrode sleeve 38 is provided with a fixed end electrode adjusting spring 39 to press the fixed end negative electrode sleeve 38 on the upper end of the hollow cylindrical negative electrode adapting piece 37; the inner bottom of the fixed end negative sleeve 38 is provided with a matched fixed end insulator 40 whose lower end is embedded with a fixed end positive electrode 41; the hollow cylindrical negative electrode adapting piece 37 internally collar joints with a hollow cylindrical electrode insulating limit member whose upper inner wall is provided with a limit annular groove 42, and a positive electrode sleeve 43 is provided in the hollow cylindrical electrode insulating limit member, the outer wall of the positive electrode sleeve 43 provided with a positive electrode sleeve flange 44 radially matching with the limit annular groove 42, the positive electrode sleeve 43 sliding along the axial direction of the limit annular groove 42 through the positive electrode sleeve flange 44; the positive electrode sleeve 43 is internally provided with a positive electrode electric brush 45 successively extending from the lower opening of the positive electrode sleeve 43 and the lower end of the hollow cylindrical electrode insulating limit member, and the positive electrode sleeve 43 is also provided with a positive electrode electric brush adjusting spring 46 pressing the positive electrode electric brush 45 on the positive electrode conducting ring 33, and a positive electrode adjusting spring 47, which presses the upper end of the positive electrode sleeve 43 on the fixed end positive electrode 41, is arranged between the lower end of the positive electrode sleeve 43 and the inner wall of the lower end of the hollow cylindrical electrode insulating limit member;

there are gaps between the upper end cover 7 and the small shaft segment 3, the upper end cover 7 and the upper end of the positive electrode insulating ring 29, and the lower end cover 8 and the large shaft segment 5.

The lower end of the inner wall of the large shaft segment 5 is provided with an annular sinking platform accommodating the flange plate 13, and the ultrasonic cutting holder for the honeycomb core also includes a flange end cover 48 pressing the flange plate 13 on the annular sinking platform by flange fastening bolts; the axis of the flange cooling hole 15 points to the joint where the connecting shaft of the ultrasonic cutting tool joints with the ultrasonic cutting tool.

The axis of the fixed sleeve cooling hole 11 is located above the positive electrode conducting ring 33, and the axis of the cooling hole 31 of the positive electrode insulating ring is located below the positive electrode conducting ring 33.

Figures 5, 6:
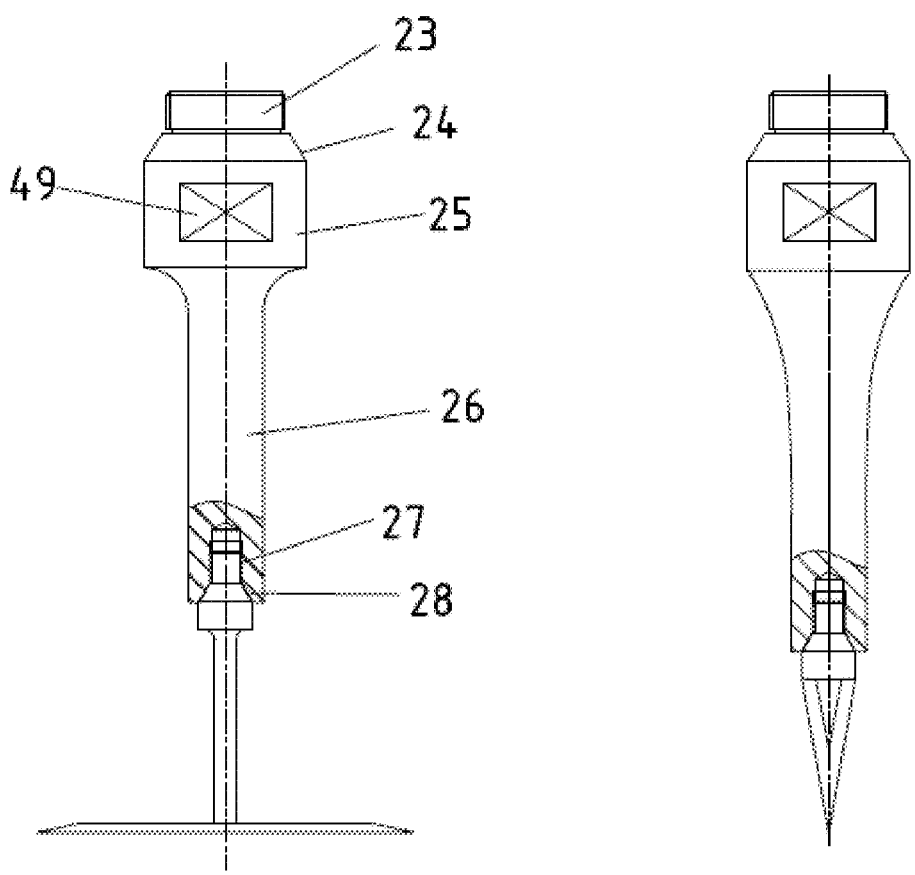
FIG. 5 is a sectional view of a second-stage amplitude transformer equipped with a large circular slicer knife in embodiment 1 of the present disclosure.
FIG. 6 is a sectional view of a second-stage amplitude transformer equipped with a straight-blade sharp knife in embodiment 1 of the present disclosure.

The detachable shaft 25 of the second-stage amplitude transformer is provided with a spanner groove 49; the outer wall of the connecting shaft 26 of the ultrasonic cutting tool is conical (as shown in FIG. 6), cylindrical (as shown in FIG. 5), conical-cylindrical compound shape (as shown in FIG. 7), or outer contoured surface formed by functions such as exponential, step, catenary and Bezier curve.

The cutting edge of ultrasonic cutting tool 1 can be a large circular slicer knife (as shown in FIG. 5), a straight-blade sharp knife (as shown in FIG. 6), or a small circular slicer knife (as shown in FIG. 7).

A diameter ratio of the first-stage amplitude transformer and the second-stage amplitude transformer is greater than or equal to 2, that is, the diameter ratio of the first-stage amplitude transformer and the front end of the second-stage amplitude transformer is greater than or equal to 2.

A total length of the transducer and the first-stage amplitude transformer is an integer multiple of a quarter-wavelength, and a total length of the second-stage amplitude transformer and the ultrasonic cutting tool 1 is an integer multiple of a quarter-wavelength plus a half-wavelength.

The connecting threaded shaft 23 of the second-stage amplitude transformer is connected to the threaded hole 18 connecting the first-stage and second-stage amplitude transformers through the fine threads; the tapered surface 19 locating the first-stage and second-stage amplitude transformers is a short tapered surface with a cone angle greater than 0° and less than 90°; the threaded blind hole segment 27 is connected to the cutting tool thread segment through fine threads, and the tapered hole 28 has a short tapered surface with a cone angle greater than 0° and less than 90°.

The holder standard interface 2 is connected to the machine tool spindle through a holder blind rivet 50 provided with a holder blind rivet inner-cooling hole 51 connected to the holder center cooling hole 6, and the holder standard interface 2 is connected to the holder blind rivet 50 by thread.

The outer wall of the hollow cylindrical negative electrode adapting piece is provided with a limit flange attached to the upper surface of the upper end cover;

the upper end of the hollow cylindrical negative electrode adapting piece 37 is provided with a tapered surface, and the bottom opening of the fixed end negative electrode sleeve 38 is provided with an opening annular groove whose bottom is matched with the upper end of the hollow cylindrical negative electrode adapting piece 37 and inner wall is matched with the outer wall of the hollow cylindrical negative electrode adapting piece 37;

the hollow cylindrical electrode insulating limit member is a separated structure, including a limit ring 52 and a limit member body 53, the lower surface of the limit ring 52 and the upper inner wall of the limit member body 53 constituting the limit annular groove 42;

the upper end of the positive electrode sleeve 43 is in a shape of frustum.

The gap between the lower end cover 8 and the big shaft segment 5 is provided with a sealing ring 54.

Embodiment 2

Figure 10:
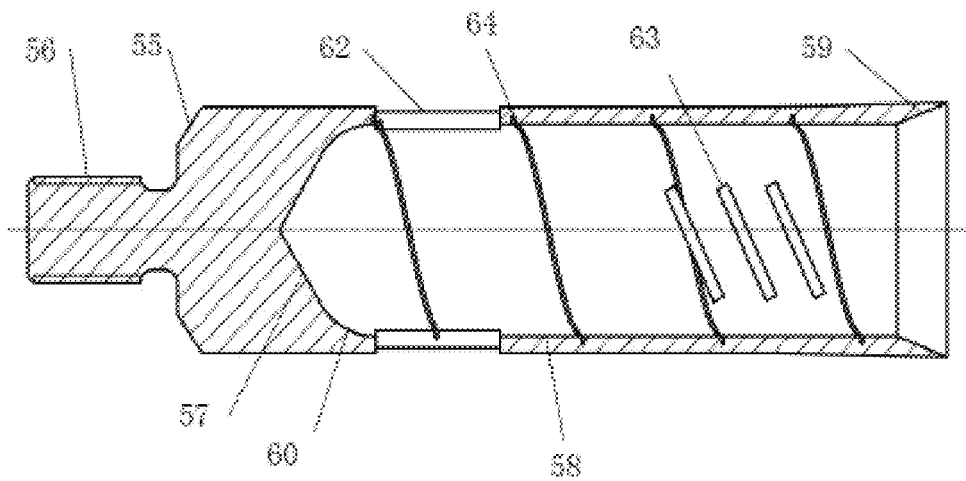
FIG. 10 is a sectional view of the ultrasonic cutting tool in embodiment 2 of the present disclosure.

As shown in FIGS. 8 to 10, an ultrasonic cutting holder for a honey-comb core, which differs from the ultrasonic cutting holder for a honeycomb core disclosed in embodiment 1 in that the ultrasonic cutting tool 1 includes a tool body;

one end of the tool body has a tool tapered segment 55 provided with a tool threaded segment 56 connected to the threaded segment of the thread blind hole, and the other end of the tool body has a groove including tapered bottom 57, cylindrical hole 58 and frustum-shaped hole 59 located at the opening of the groove; an arc transition 60 is arranged between the tapered bottom 57 and the cylindrical hole 58, and the small end of the frustum-shaped hole 59 is communicated with the cylindrical hole 58;

the frustum-shaped hole 59 and the outer wall 65 of the tool body constitute a flared cutting edge, the outer wall 65 being a part located at an end of the tool body far away from the tool tapered segment and in a shape of frustum, and the small end of the outer wall 65 is located between the two ends of the cylindrical hole;

a spanner groove 61 is arranged at the outer wall of the tool body located between the tool tapered segment 55 and the tapered bottom 57, and at least one chip outlet 62 running through the outer wall of the tool body is arranged at an end of the cylindrical hole 58 close to the tapered bottom, and at least one chute 63 running through the outer wall of the tool body is arranged at the inner wall of the cylindrical hole 58 where close to the frustum-shaped hole 59.

The inner wall of the cylindrical hole 58 is provided with a flute 64 discharging the chips to the chip outlet 62, the flute 64 being spiral upward from the frustum-shaped hole 59 to the chip outlet 62 around the axis of the ultrasonic cutting tool 1.

A length between the tool tapered segment 55 and the large end of the frustum-shaped hole 59 is 0.25-0.5 times the wavelength of the sound wave propagation in the material of the ultrasonic cutting tool 1.

The wedge angle of the flared cutting edge formed by the frustum-shaped hole 59 is 2-10°.

The chutes 63 incline to the tool tapered segment 55, and there are at least 3 chutes 63 being parallel to each other and arranged at equal intervals along the axis of ultrasonic cutting tool 1, and the interval between chutes 63 is less than the wavelength of sound wave propagation in the material of the ultrasonic cutting tool 1.

2 chip outlets 62 are evenly distributed around the ultrasonic cutting tool 1, the chip outlet 62 being a rectangular outlet with the long side paralleling to the axis of ultrasonic cutting tool 1.

The spanner groove 61 is rectangular and its plane is parallel to the axis of the ultrasonic cutting tool 1.

The ultrasonic cutting tool 1 is made of high-speed steel or cemented carbide.

The cutter tapered segment 55 has a conical surface.

This embodiment is used to process honeycomb core with high density, the spiral direction of the flute 64 is opposite to the rotating direction of the ultrasonic cutting tool 1. Due to the high hardness and small machining deformation of the honeycomb core, the discharging direction of the chips core after each cutting is opposite to the rotating direction of the ultrasonic cutting tool 1, the chip cores rising along the flute 64; the chip cores generated by the next cutting push it up to the chip outlets 62, and so on, realizing automatic chip discharge.

Embodiment 3

Figure 11:
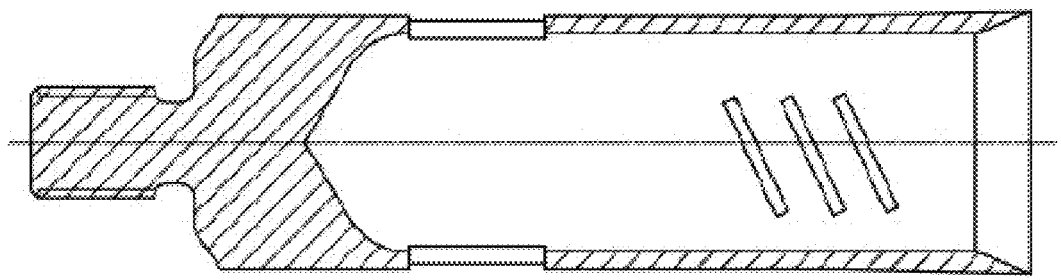
FIG. 11 is a sectional view of the ultrasonic cutting tool in embodiment 3 of the present disclosure.

As shown in FIG. 11, an ultrasonic cutting holder for a honeycomb core, which differs from the ultrasonic cutting holder for the honeycomb core in embodiment 2 in that the ultrasonic cutting tool 1 is without flute.

This embodiment is used to process the honeycomb core with low density. Due to the large machining deformation of the medium and low density honeycomb core, and the smaller friction between the inner wall of the groove and the honeycomb core chip, under the action of ultrasonic vibration and ultrasonic wear reduction, the chip cores will be detached from the groove after a single cutting, thus realizing automatic chip discharge.

Figure 13:
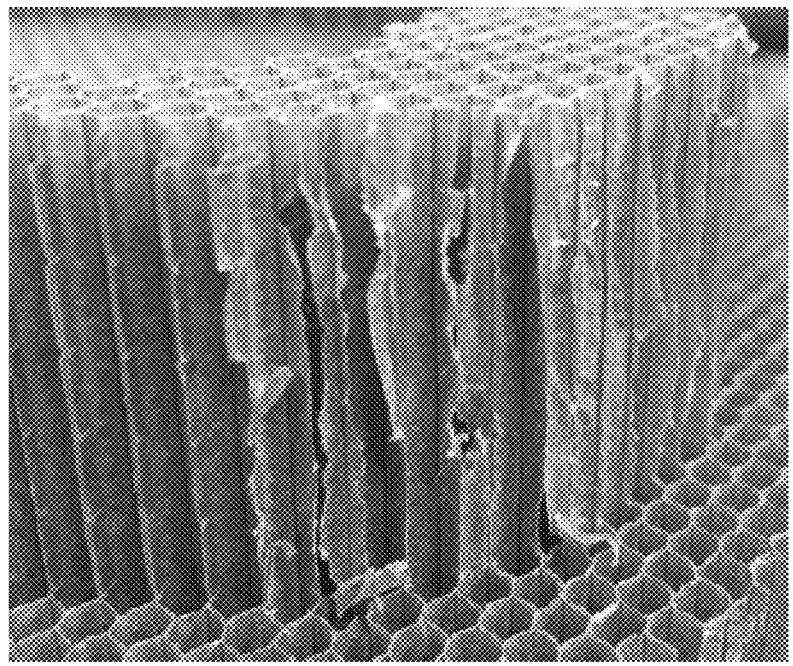
FIG. 13 is the arc feature of honeycomb core machined by ordinary cutting tool.
Figure 14:
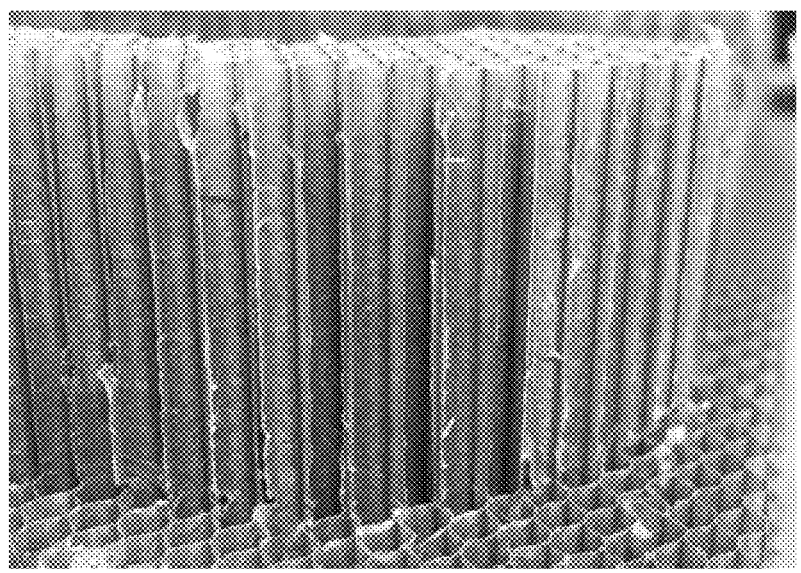
FIG. 14 is the arc feature of honeycomb core machined by the ultrasonic cutting tool in embodiment 2 of the present disclosure.

FIG. 13 and FIG. 14 respectively show the arcs of ordinary cutting tool and the ultrasonic cutting tool 1 of the present disclosure after cutting the honeycomb core, which can be seen that the present disclosure significantly improves the machining quality of the honeycomb core's arc.

Embodiment 4

Figure 12:
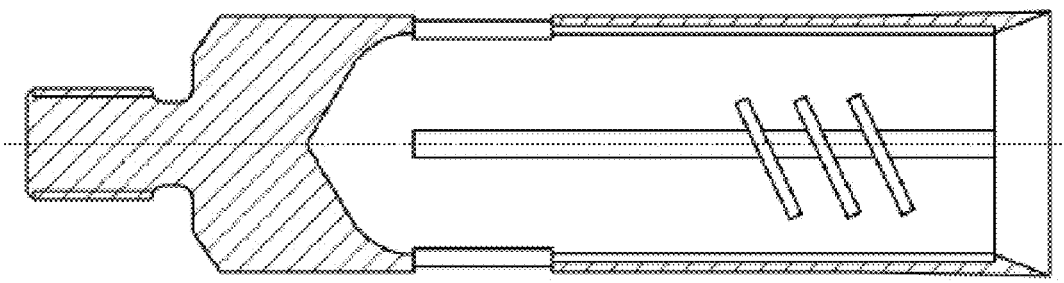
FIG. 12 is a sectional view of the ultrasonic cutting tool in embodiment 4 of the present disclosure.

As shown in FIG. 12, an ultrasonic cutting holder for a honeycomb core, which differs from the ultrasonic cutting holder for a honeycomb core in embodiment 2 in that the flute 64 is parallel to the axis of the ultrasonic cutting tool 1.

This embodiment is used to process the honeycomb core with medium density, the flute 64 parallels to the axis of the ultrasonic cutting tool 1. During processing, a small part of the chips in flute 64 will be separated under rotation and be discharged through the flute 64 and the chip outlet 62; however, since the diameter of the residual chips having not been chopped is smaller than the diameter of the groove, the residual chips will be detached from the groove under the action of ultrasonic vibration and ultrasonic wear reduction, thus realizing automatic chip discharge.

Finally, it should be noted that the above embodiments are used only to illustrate the technical solutions of the present disclosure without limit it; although the present disclosure is described in detail with reference to the foregoing embodiments, the ordinary skilled in the art should understand that they may still make amendments to the technical solutions disclosed in the foregoing embodiments, or make equal replacements for some or all of their technical characteristics; these amendments or replacements do not remove the essence of the corresponding technical solutions from the scope of the technical solutions of each embodiment of the present disclosure.

The invention claimed is:

1. An ultrasonic cutting holder for honeycomb core, comprising a holder, a swing mechanism, a transducer, a first-stage amplitude transformer, a second-stage amplitude transformer, an ultrasonic cutting tool and an ultrasonic power transmission mechanism; wherein, the holder comprises a holder standard interface at the upper end of the holder and a holder shell at the lower end of the holder; an outer wall of the holder shell is in a shape of stepped shaft, the holder shell comprising a small shaft segment, a middle shaft segment and a large shaft segment, which are successively connected; the small shaft segment is connected to the holder standard interface; the holder standard interface has a holder center cooling hole extending to the small shaft segment;

the swing mechanism comprises an upper end cover outside the small shaft segment, an lower end cover outside the large shaft segment and a fixed sleeve connected to the outer wall of the middle shaft segment by a bearing, the fixed sleeve being located between outer edges of the upper end cover and the lower end cover; the fixed sleeve has a fixed sleeve cooling hole, and the inner wall of the fixed sleeve has a fixed sleeve annular bulge pressing outer ring of the bearing on the lower end cover;

the first-stage amplitude transformer is cylindrical; outer wall of the lower end of the first-stage amplitude transformer has a flange plate extending outward and connected to inner wall of the large shaft segment; upper and lower ends of the flange plate are respectively provided with an annular vibration isolation groove, the two annular vibration isolation grooves being coaxial with the first-stage amplitude transformer and staggered with each other, and the flange plate is evenly arranged a plurality of flange cooling holes; the axis location of the first-stage amplitude transformer is provided with stepped holes running through the first-stage amplitude transformer, the stepped holes successively comprising a central cooling hole of the first-stage amplitude transformer, a taper hole of the first-stage amplitude transformer, a threaded hole connecting the first-stage and second-stage amplitude transformers and a tapered surface locating the first-stage and second-stage amplitude transformers;

the transducer comprises an inner-cooling preload bolt with a hollow structure, a back shroud and an annular ceramic chip group; the inner-cooling preload bolt is threaded connected to the central cooling hole of the first-stage amplitude transformer and presses the annular ceramic chip group at the rear end of the first-stage amplitude transformer through the back shroud;

the second-stage amplitude transformer successively comprises a connecting threaded shaft of the second-stage amplitude transformer, a matching tapered shaft of the second-stage amplitude transformer, a detachable shaft of the second-stage amplitude transformer and a connecting shaft of ultrasonic cutting tool; the connecting threaded shaft of the second-stage amplitude transformer is connected to the threaded hole connecting the first-stage and second-stage amplitude transformers; the outer wall of the matching tapered shaft of the second-stage amplitude transformer matches the tapered surface locating the first-stage and second-stage amplitude transformers; a lower end of the connecting shaft has a threaded blind hole connected to the ultrasonic cutting tool; the threaded blind hole comprises a threaded segment of the threaded blind hole and a taper hole at the opening of the threaded blind hole; a connecting part of the ultrasonic cutting tool has a tool threaded segment and a tool tapered segment respectively matching the threaded blind hole segment and the taper hole;

the ultrasonic power transmission mechanism comprises a positive electrode insulating ring collar jointing with the small shaft segment; an upper end of the positive electrode insulating ring is located below the upper end cover, and a lower end of the positive electrode insulating ring is provided with an annular bulge on a plane, the plane being formed by inner race of the bearing and a shaft shoulder between the small shaft segment and the middle shaft segment; the annular bulge presses the inner race of the bearing on a shaft shoulder between the middle shaft segment and the large shaft segment, and the annular bulge has a plurality of positive electrode insulating ring cooling holes; the small shaft segment is provided with a holder radial cooling hole communicated to the positive electrode insulating ring cooling holes; the positive electrode insulating ring collar joints with a positive electrode conducting ring whose lower end is located on the annular bulge; the positive electrode insulating ring has a positive electrode insulating ring wiring hole, and the small shaft segment has a holder wiring hole communicated to the positive electrode insulating ring wiring hole; the positive electrode conducting ring is provided with a wire whose the other end is connected to the positive electrode of the transducer through the positive electrode insulating ring wiring hole and the holder wiring hole; the upper end cover has an upper end cover threaded hole in which is provided with a hollow cylindrical negative electrode adapting piece; the upper end of the hollow cylindrical negative electrode adapting piece collar joints with bottom opening of a fixed end negative electrode sleeve; the upper end of the fixed end negative electrode sleeve is provided with a fixed end electrode adjusting spring to press the fixed end negative electrode sleeve on the upper end of the hollow cylindrical negative electrode adapting piece; inner bottom of the fixed end negative sleeve is provided with a matched fixed end insulator whose lower end is embedded with a fixed end positive electrode; the hollow cylindrical negative electrode adapting piece internally collar joints with a hollow cylindrical electrode insulating limit member whose upper inner wall is provided with a limit annular groove, and the hollow cylindrical electrode insulating limit member is provided with a positive electrode sleeve whose outer wall has a positive electrode sleeve flange radially matched with the limit annular groove, the positive electrode sleeve sliding along the axial direction of the limit annular groove through the positive electrode sleeve flange; the positive electrode sleeve is provided with a positive electrode electric brush extending from lower opening of the positive electrode sleeve and lower end of the hollow cylindrical electrode insulating limit member, and is also provided with a positive electrode electric brush adjusting spring pressing the positive electrode electric brush to the positive electrode conducting ring, and a positive electrode adjusting spring, which presses upper end of the positive electrode sleeve on the fixed end positive electrode, is arranged between the lower end of the positive electrode sleeve and the inner wall of the lower end of the hollow cylindrical electrode insulating limit member; there are gaps between the upper end cover and the small shaft segment, the upper end cover and the upper end of the positive electrode insulating ring, and the lower end cover and the large shaft segment.

2. The ultrasonic cutting holder for honeycomb core according to claim 1, wherein the detachable shaft of the second-stage amplitude transformer is provided with a spanner groove; the outer wall of the connecting shaft of the ultrasonic cutting tool is conical, cylindrical, conical-cylindrical compound shape, or outer contoured surface formed by functions of exponential, step, catenary and Bezier curve.

3. The ultrasonic cutting holder for honeycomb core according to claim 1, wherein a diameter ratio of the first-stage amplitude transformer and the second-stage amplitude transformer is greater than or equal to 2, that is, the diameter ratio of the first-stage amplitude transformer and the front end of the second-stage amplitude transformer is greater than or equal to 2; and a total length of the transducer and the first-stage amplitude transformer is an integer multiple of a quarter-wavelength, and a total length of the second-stage amplitude transformer and the ultrasonic cutting tool is an integer multiple of a quarter-wavelength plus a half-wavelength.

4. The ultrasonic cutting holder for honeycomb core according to claim 1, wherein the connecting threaded shaft of the second-stage amplitude transformer is connected to the threaded hole connecting the first-stage and second-stage amplitude transformers through fine threads; the tapered surface locating the first-stage and second-stage amplitude transformers is a short tapered surface with a cone angle greater than 0° and less than 90°; the threaded blind hole segment is connected to the cutting tool thread segment through fine threads, and the tapered hole has a short tapered surface with a cone angle greater than 0° and less than 90°.

5. The ultrasonic cutting holder for honeycomb core according to claim 1, wherein an axis of the fixed sleeve cooling hole is located above the positive electrode conducting ring, and an axis of the positive electrode insulating ring cooling hole is located below the positive electrode conducting ring; and the holder standard interface is connected to the machine tool spindle through a holder blind rivet which is provided with a holder blind rivet inner-cooling hole connected to the holder center cooling hole, and the holder standard interface is connected to the holder blind rivet by thread.

6. The ultrasonic cutting holder for honeycomb core according to claim 1, wherein the lower end of the inner wall of the large shaft segment is provided with an annular sinking platform accommodating the flange plate, and the ultrasonic cutting holder also comprises a flange end cover pressing the flange plate on the annular sinking platform by flange fastening bolts; an axis of the flange cooling hole points to a joint where the connecting shaft of the ultrasonic cutting tool joints with the ultrasonic cutting tool.

7. The ultrasonic cutting holder for honeycomb core according to claim 1, wherein the outer wall of the hollow cylindrical negative electrode adapting piece is provided with a limit flange attached to the upper surface of the upper end cover;

the upper end of the hollow cylindrical negative electrode adapting piece has a tapered surface, and the bottom opening of the fixed end negative electrode sleeve has an opening annular groove whose bottom is matched with the upper end of the hollow cylindrical negative electrode adapting piece and inner wall is matched with the outer wall of the hollow cylindrical negative electrode adapting piece; and the hollow cylindrical electrode insulating limit member is a separated structure comprising a limit ring and a limit member body, lower surface of the limit ring and upper inner wall of the limit member body constituting the limit annular groove; the upper end of the positive electrode sleeve is in a shape of frustum.

8. The ultrasonic cutting holder for honeycomb core according to claim 1, wherein the ultrasonic cutting tool comprises a tool body;

one end of the tool body has a tool tapered segment, provided with a tool threaded segment connected to the threaded segment of the threaded blind hole, and the other end of the tool body has a groove comprising a tapered bottom, a cylindrical hole and a frustum-shaped hole located at the opening of the groove; an arc transition is arranged between the tapered bottom and the cylindrical hole, and the small end of the frustum-shaped hole is communicated with the cylindrical hole;

the frustum-shaped hole and an outer wall of the tool body constitute a flared cutting edge, the outer wall being a part located at an end of the tool body far away from the tool tapered segment and in a shape of frustum, and a small end of the outer wall is located between the two ends of the cylindrical hole; and a spanner groove is arranged at an outer wall of the tool body located between the tool tapered segment and the tapered bottom, and at least one chip outlet passing through the outer wall of the tool body is arranged at an end of the cylindrical hole close to the tapered bottom, and at least one chute is arranged at an inner wall of the cylindrical hole where close to the frustum-shaped hole, the chute passing through the outer wall of the tool body.

9. The ultrasonic cutting holder for honeycomb core according to claim 8, wherein inner wall of the cylindrical hole is provided with a flute discharging chips to the chip outlet, the flute being parallel to the axis of the ultrasonic cutting tool or being spiral upward from the frustum-shaped hole to the chip outlet around the axis of the ultrasonic cutting tool;

a length between the tool tapered segment and a large end of the frustum-shaped hole is 0.25-0.5 times the wavelength of the sound wave propagation in the ultrasonic cutting tool material, and a wedge angle of the flared cutting edge is 2-10°;

the chutes incline to the tool tapered segment, and there are at least 3 chutes being parallel to each other and arranged at equal intervals along the axis of ultrasonic cutting tool, and the interval between chutes is less than the wavelength of sound wave propagation in the ultrasonic cutting tool material;

at least 2 chip outlets are evenly distributed around the ultrasonic cutting tool, the chip outlet being a rectangular outlet with a long side paralleling to the axis of ultrasonic cutting tool, or an elliptic outlet inclined to the axis of the ultrasonic cutting tool, or other shape outlet that facilitate chip discharge;

the spanner groove is rectangular and its plane is parallel to the axis of the ultrasonic cutting tool; and the ultrasonic cutting tool is made of high-speed steel or cemented carbide.

* * * * *